United States Patent [19]
Tomida

[11] Patent Number: 6,052,446
[45] Date of Patent: Apr. 18, 2000

[54] COMMUNICATION DEVICE THAT IDENTIFIES AND STORES AND INCOMING SIGNAL AND TRANSMITS THE SIGNAL TO A COMPUTER

[75] Inventor: Wataru Tomida, Owariasahi, Japan

[73] Assignee: Brother Kogyo Kabushiki Kaisha, Nagoya, Japan

[21] Appl. No.: 08/990,815

[22] Filed: Dec. 15, 1997

[30] Foreign Application Priority Data

Dec. 19, 1996 [JP] Japan ................................. 8-354895

[51] Int. Cl.[7] .................................................. H04M 11/00
[52] U.S. Cl. .............................. 379/100.16; 379/100.15; 379/93.11; 379/373
[58] Field of Search .............................. 379/93.05, 93.09, 379/93.11, 100.02, 100.15, 102.02, 373, 100.16

[56] References Cited

U.S. PATENT DOCUMENTS

| | | | |
|---|---|---|---|
| 4,998,273 | 3/1991 | Nichols | 379/102.02 |
| 5,317,629 | 5/1994 | Watanabe | 379/93.09 |
| 5,361,296 | 11/1994 | Reyes et al. | 379/102.02 |
| 5,471,522 | 11/1995 | Sells et al. | 379/93.11 |
| 5,758,081 | 5/1998 | Aytac | 395/200.42 |

*Primary Examiner*—Stella Woo
*Attorney, Agent, or Firm*—Oliff & Berridge, PLC

[57] ABSTRACT

A multifunction communication device is provided which transmits a call identity signal to a computer through an outside communication line resulting in the device transmitting data and the computer receiving at least a portion of any data received by the device. The multifunction device includes signal identification means, storage means and transmitting means. The signal identification means identifies the call identity signal patterns for the plurality of call identity signals sent from a line exchange. The storage means stores a specific pattern from the plurality of call identity signals having a specific pattern designating the computer. The transmitting means transmits to the computer at least a part of the data following each call identity signal when a pattern of the call identity signal is identified as having the specific pattern by the signal identification means. The device may also include input means for allocating the respective function of each pattern of the call identity signals transmitted from the line exchange.

24 Claims, 7 Drawing Sheets

COMMUNICATION DEVICE THAT IDENTIFIES AND STORES AND INCOMING SIGNAL AND TRANSMITS THE SIGNAL TO A COMPUTER

BACKGROUND OF THE INVENTION

1. Field of Invention

The invention relates to a multifunction communication device that can be connected to a computer, such as, for example, a personal computer, and is capable of performing various functions, such as, for example, telephone and facsimile functions. In particular, the invention relates to a communication device that transmits a call identity signal designating a computer through an outside communication line resulting in the device transmitting data and the computer receiving at least a portion of any received data.

2. Description of Related Art

Conventionally, portable and stationary multifunction communication devices such as personal, notebook and laptop computers, capable of implementing telephone and facsimile functions when connected to a telephone line, are increasingly being used. These multifunction devices are designed to include a printer, image scanner, receiver and an operation panel. The receiver is typically used to carry out the telephone function. Moreover, by operating the printer or image scanner, the facsimile function, which sends and receives facsimile data through the telephone line, the printer function, which prints out received data, or the image reader function, which sends and receives image information, can each be carried out by a computer.

Also, when the multifunction device receives an incoming call having a calling signal through a telephone line, the data received subsequent to the calling signal is identified. When the identified calling signal is facsimile data, the facsimile data is automatically received and printed. In addition, when the received data is a sound signal, a calling sound is output.

Recently, a distinctive ring service is increasingly being used where a customer can register two or three different telephone numbers while signing up for a single line with the telephone company. Customized call identity signals are then sent to each telephone number as calling signals, notifying the customers that a signal is being received from the line switching office, or line exchange.

In short, the multifunction device has recently been configured to be compatible with the distinctive ring service so that when a sender makes calls to the device, the device can distinguish between the telephone numbers for the telephone and facsimile lines. Therefore, instead of identifying the data when it is received, the incoming data can be identified based on the call identity signal sent to the device. When a call identity signal is sent to the telephone line, a calling bell synchronized to the call identity signal is rung. Also, when the call identity signal is directed to the facsimile line, the incoming data is automatically received and printed.

However, regardless of whether or not the multifunction communication device interacting with the computer actually receives the distinctive ring service as described above, when the device receives facsimile data having information unnecessary to store, such as, for example, an advertisement, since all received facsimile data is printed on recording paper regardless of its utility or need, there exits the problem of wasting a great deal of paper. Additionally, when image or data information is received and recorded on the recording paper and then taken to the computer to be used, an additional read-in operation, the information is read into the computer using an image reader or optical character reader (OCR), becomes necessary. Obviously, these problems result in a user wasting time and resources.

SUMMARY OF THE INVENTION

In order to overcome the shortcomings in the related art mentioned above, according to an aspect of the invention, it is possible to provide a multifunction communication device that identifies an incoming signal from a plurality of call signals, stores each signal and transmits a signal to a computer.

An object of the invention is to have a multifunction communication device that prevents the wasting of recording paper and selectively prints indicated data.

Another object of the invention is to provide a multifunction communication device that stores usable data by sending and storing in the computer at least a portion of the received data that follows a call identity signal customized for a computer.

In short, the multifunction communication device is capable of being connected with a computer and line exchange through an external communication line. The device includes signal identification means, storage means and transmitting means. The signal identification means identifies the call signal patterns for the plurality of call signals sent from the line exchange. The storage means is capable of storing the fact that a specific pattern from the plurality of call signal patterns sent from the line exchange is a pattern having a function that designates the computer. The signal sending, or transmitting, means transmits to the computer at least a part of the data following each call signal when a pattern of a call signal is identified as a specific pattern by the signal identification means.

Because the specific pattern designating the computer is stored beforehand in the storage means, when the call signal sent from the line exchange is identified by the signal identification means as the specific pattern, the signal sending means transmits to the computer at least a part of the data following each call signal. Thus, since a part of the data received following the call identity signal exclusively designating the computer is sent to and stored in the computer, a user may retrieve the stored data, select portions of the data that the user wants to record and print the data on recording paper. Therefore, the prevention of wasteful consumption of recording paper is possible.

In addition, it is also possible to store the received data in the computer, where the data is capable of, such as, for example, being revised and used without requiring a device to perform a read-in operation, such as, for example, an image reader or OCR.

Further, the communication device may also include input means for allocating the respective function of each pattern of the call signals sent from the line exchange that are stored in the storage means. Thus, the pattern of each call signal is linked with a respective function and is easily stored in the storage means by the input means.

Furthermore, as a function designating the computer, it is possible to store voice or facsimile messages for later reproduction.

BRIEF DESCRIPTION OF THE DRAWINGS

The invention will be described in conjunction with the following drawing in which like reference numerals designate like elements and wherein.

DETAILED DESCRIPTION OF THE PREFERRED EMBODIMENT

Figure 1:
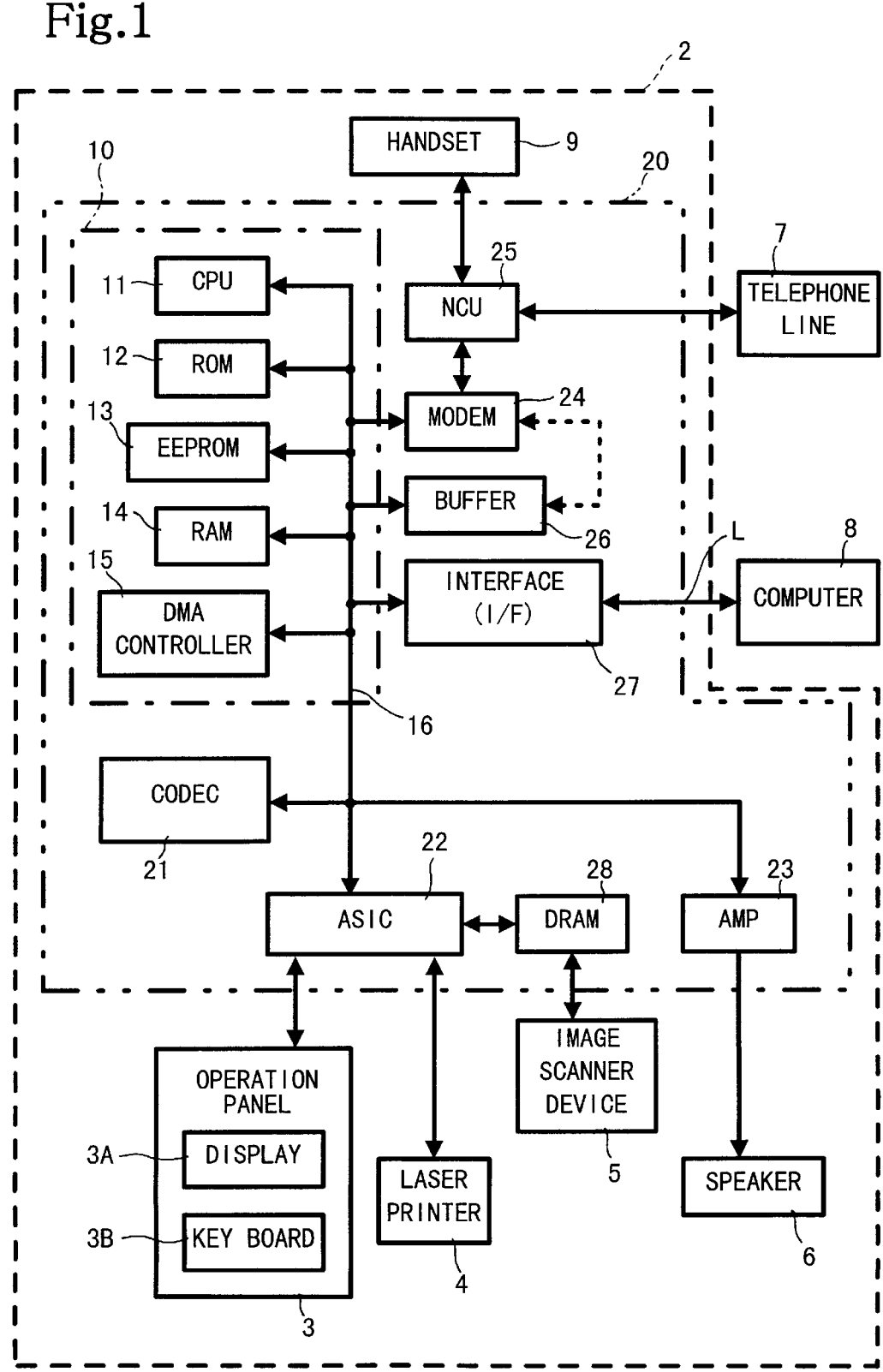
FIG. 1 is a block diagram illustrating the control system of the multifunction communication device according to a preferred embodiment of the invention.

While the invention will hereafter be described in connection with preferred embodiments thereof, it will be understood that it is not intended to limit the invention to those embodiments. On the contrary, it is intended to cover all alternatives, modifications, and equivalents that may be included within the spirit and scope of the invention as defined by the appended claims.

Hereinafter, a detailed description of embodiments of the communication device of this invention is provided with reference to the drawings. In the drawings, like reference numerals have been used throughout to designate like elements.

The preferred embodiment of the invention is a multi-function communication device, or MFD, having a telephone function, sound function, laser printer, image scanner, and a facsimile function connected to a computer through a connecting cable.

FIG. 1 illustrates a block diagram of the control system of the MFD 2. The MFD 2 includes a control unit 20 having a control component 10. An operation panel 3, laser printer 4, image scanner device 5 and speaker 6 which outputs sound are connected to the control unit 20. The control component 10 includes a central processing unit 11, or CPU, ROM 12, EEPROM 13, RAM 14, and DMA controller 15. The CPU 11, ROM 12, EEPROM 13, RAM 14, and DMA controller 15 are connected by a common bus 16 having a data bus (not shown).

The EEPROM 13 is able to rewrite data by electronically deleting it. Also connected to the common bus 16 are a CODEC 21, ASIC 22, sound amplifier 23, modem 24, buffer 26, and interface 27. The CODEC 21 has a compressing component to shorten the image information and decoding component which decodes the compressed communication data. The application specific integrated circuit 22, or ASIC, which inputs and outputs data, is formed by a hard logic circuit. The sound amplifier, or AMP 23, drives the speaker 6, while the modem 24 is used for facsimile communications and transferring sound and is connectable to the data buffer 26. The interface 27, or I/F, is for telecommunication and is connected to the computer 8 by connecting cable L. Additionally, a telephone line 7 and a network control unit 25, or NCU, which is connected to handset 9, are also connected to the modem 24.

Moreover, an operation panel 3, or input means, includes a display 3a and keyboard 3b. The laser printer 4 is connected to the ASIC 22 and is used for inputting/outputting information, while the image scanner device 5 is connected to the DRAM 28. In the DRAM 28, dot data for 2–3 dot lines, which are read-in by the image scanner device 5, are temporally stored as image information. The image information is then read-out by the ASIC 22.

A control program is stored in the ROM 12 which operates the laser printer 4 and/or the image scanner device 5 and implements the facsimile function to control the sending and receiving of the image information as facsimile data to and from an outside facsimile device (not shown) through the telephone line 7. A control program provides a copy function to record the image information read-in by the image scanner device 5 while another control program implements a print function to record print data received from the computer 8. Another control program carries out the image reader function which sends the image information which is read-in by the image scanner device 5 to the computer 8.

Also stored in the ROM 12 is a control program that implements the telephone function of sending and receiving sound signals to and from the receiver via the telephone line 7. Another control program stored in the ROM 12 implements a sound function to output the sound information received through the telephone line 7 or the I/F 27 used for communicating with the speaker 6.

The MFD 2 can receive the distinctive ring service where three telephone numbers are registered with the telephone company for one line. Therefore, three different exclusive call identity signals, hereafter referred to as CI signals, one for each telephone number, are sent as calling signals to indicate calls from the line exchange. In short, the exclusive CI signals corresponding to the registered telephone numbers are distinguished and output from the line exchange. However, to obtain the maximum benefit of the device, that is, not printing each facsimile upon receipt or receiving every call, wanted or unwanted, in the U.S., the facsimile line and the phone line may be unlisted and the third line for the computer the only publicly listed number. Thus, unless the calling party has been provided the facsimile or voice numbers, all calls would go to the computer. If all three lines are listed, then the caller can choose the telephone number appropriate to the communication desired.

Figure 2:
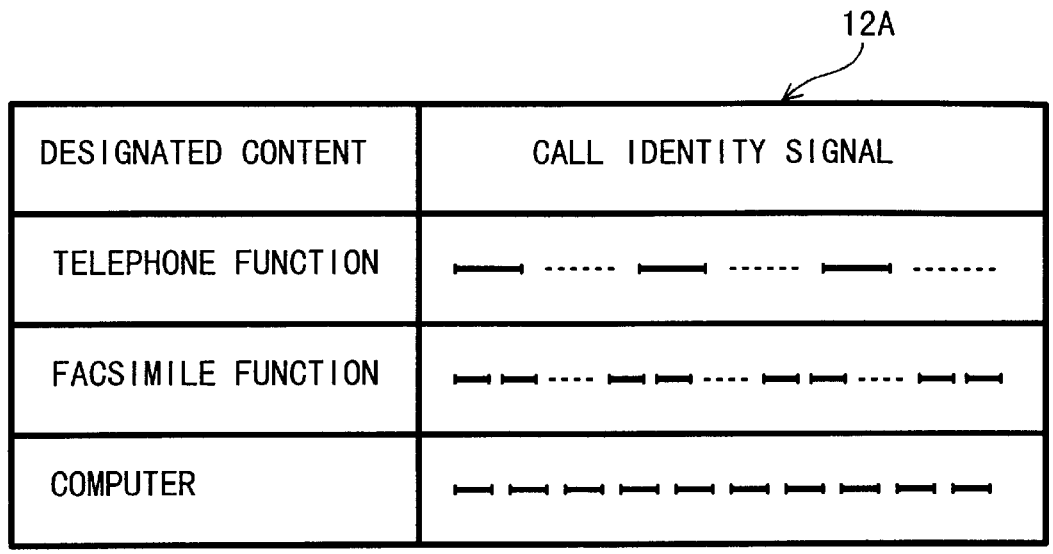
FIG. 2 is a chart illustrating the structure of the call identity signal registration data associating the call identity signal with the designated content.

As shown in FIG. 2, since the signal registration memory 12a is installed in the ROM 12, the first CI signal of the first telephone number is recorded so as to correspond to the "telephone function". Similarly, the second CI signal of the second telephone number is recorded so as to correspond to "the facsimile function", while the third CI signal of the third telephone number is recorded so as to correspond to "the computer". Also, when these functions are being installed, they can optionally be installed through the installing menu displayed on the display 3a when the function installing key provided in the keyboard 3b is operated.

The CPU 11 of the MFD 2 is also capable of receiving a timer interrupt signal through a built-in timer which counts a clock signal from a clock connected to the CPU 11. The timer interrupt signal has a duration of approximately 1/60 of a second. Thus, each time the CPU 11 receives the timer interrupt signal when performing the parallel processing of the plurality of units for the control program, a plurality of functions can simultaneously be implemented by performing the parallel processing. The parallel processing is accomplished by successively switching between the functions using the time division method. The switching is accomplished at a rate of approximately 1/60 of a second. The plurality of units for the control program includes control programs, such as, for example, facsimile data transmission and print function.

The EEPROM 13 stores the setting modes for carrying out the facsimile function as well as installing the data relating to the necessary letter positioning and letter density. The EEPROM 13 also stores setting modes for implementing the printer function, in addition to storing a plurality of the senders telephone numbers.

Moreover, various memories and buffers are provided in the RAM 14 which are necessary to execute the control programs implementing the various functions.

Now, the computer 8 connected to the MFD 2 will be explained.

Figure 3:
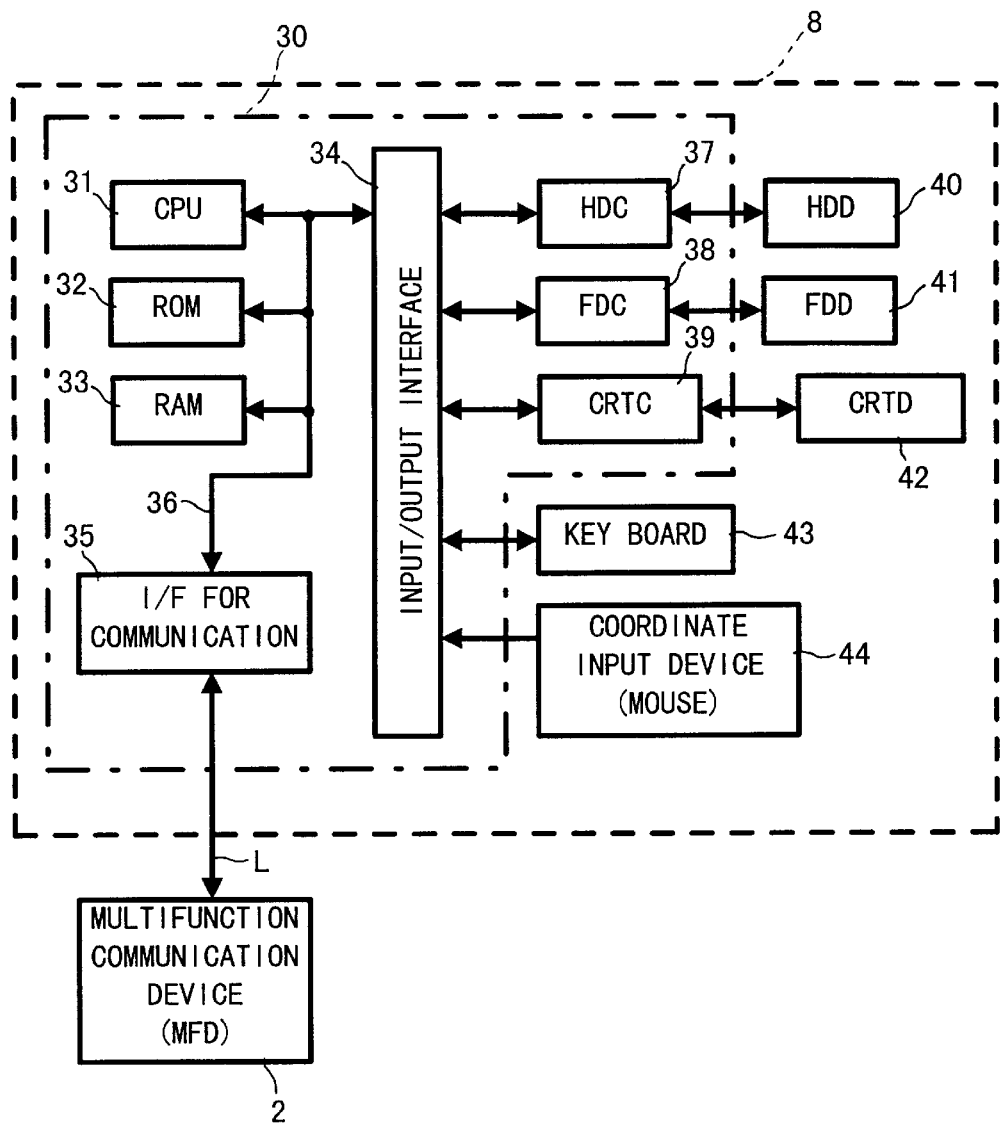
FIG. 3 is a block diagram illustrating the control system of a computer.

As shown in FIG. 3, the computer 8 includes a control device 30, to which are connected a hard disk drive 40, or HDD, floppy disk drive 41, or FDD, CTR display 42, or CRTD, key board 43 and a coordinate input device 44, such as, for example, a mouse. The control device 30 includes a CPU 31, ROM 32, RAM 33, input/output interface 34 and the interface, or I/F, for communication 35, connected to the CPU 31 by a common bus 36. The bus 36 which includes a data bus, hard disk controller, or HDC, which is connected to input/output interface 34, floppy disk controller 38, or FDC and CRT controller 39, or CRTC.

Furthermore, the MFD 2 is connected to the computer 8 by the connecting cable L at the I/F for communication 35. Therefore, it is possible to send or receive print data to or from the MFD 2, record print data in the laser printer 4 and receive the image information read-in at the image scanner device 5. Moreover, in the hard disk, which is set in the hard disk drive 40, a received data memory (not shown) is provided which stores various data, such as, for example, facsimile information transferred from the MFD 2. Also in the hard disk, in addition to the various control programs which control the computer 8, are stored a control program for write-in control and a control program for read-out control, both of which will be described later.

Figure 4:
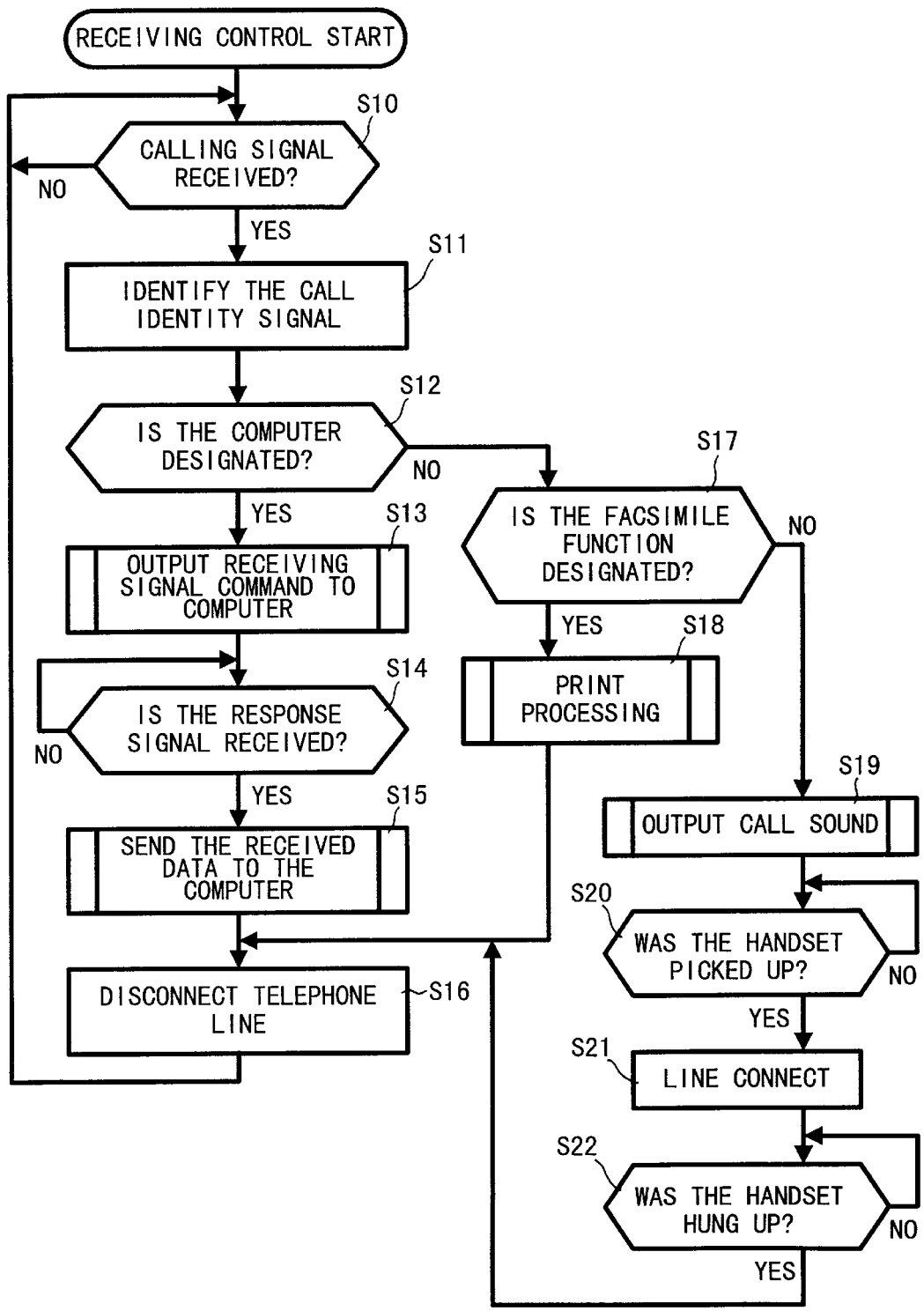
FIG. 4 is a flowchart illustrating the receiving control routine.

Now the receiving control routine, performed by the control component 10 of the MFD 2, will be explained as illustrated in the flowchart of FIG. 4.

First, the power of the MFD 2 is turned on so the receiving control is started. At step S10, the NCU 25 receives a calling signal from the line exchange through the telephone line 7 and the calling signal is detected. The CI signal corresponding to that calling signal is identified in the next step S11. In short, the received CI signal is identified as one of the three types of signals indicated in FIG. 2. Thus, step S11 identifies the CI signal and is equivalent to the signal identification means.

Now, based on the CI signal and the CI signal registration data, the next step S12 involves the received CI signal designating the computer 8, resulting in the receiving signal command to be output to the computer 8 at step S13. Then, at step S14, the response signal indicating that the data can be received is received from the computer 8. Whereupon at step S15, at least a portion of the received data following the CI signal is set and output to the computer 8. In short, there is a category to send all data, including the protocol of communication, to the computer 8. Additionally, there is a category in which the protocol is performed at the MFD 2 and sent to the computer 8. The image data after the protocol has been set to the computer is restricted. Hence, the steps S13–S15 are equivalent to the signal sending means.

Figure 5:
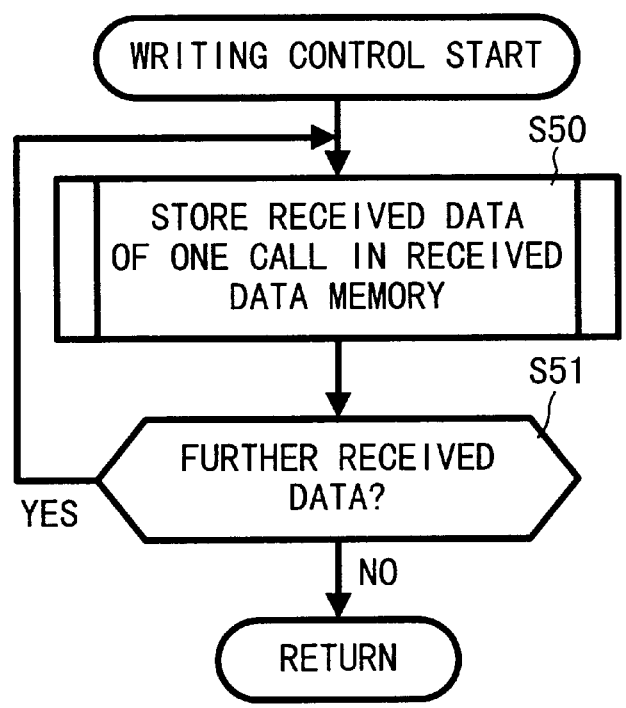
FIG. 5 is a flowchart illustrating the writing-in control routine.

As shown in FIG. 5, when a command is received by the computer 8 to store the data received from the MFD 2, writing control is started and the received data of one call is stored in the received data memory at step S50. At step S51, a determination is made as to whether further received data needs to be stored. If so, step S50 is repeatedly executed. At step S51, the process returns to the main routine when it is determined that there is no longer any received data to be stored.

Referring back to FIG. 4, during receiving, or incoming, control, the connected line is disconnected at step S16 when a busy sound is detected when the receiving party terminates the transmission of communication data and the process returns to step S10.

At step S17, when a received CI signal designates a facsimile function, the facsimile data following the CI signal is output to the laser printer 4. At step S18, a print process is executed upon the facsimile data to form text on the recording paper. The process returns to step S10.

Further, at step S17, the received CI signal can also designate a telephone function and not a facsimile function. At which step S19, a call sound, synchronized to the CI signal having a telephone function, is output from the speaker 6. Then, when the handset 9 is picked up at step S20, the line is connected during step S21. Then, at step S22, when the conversation ends the handset 9 is replaced on the handset cradle and the process returns to step S10.

Figure 6:
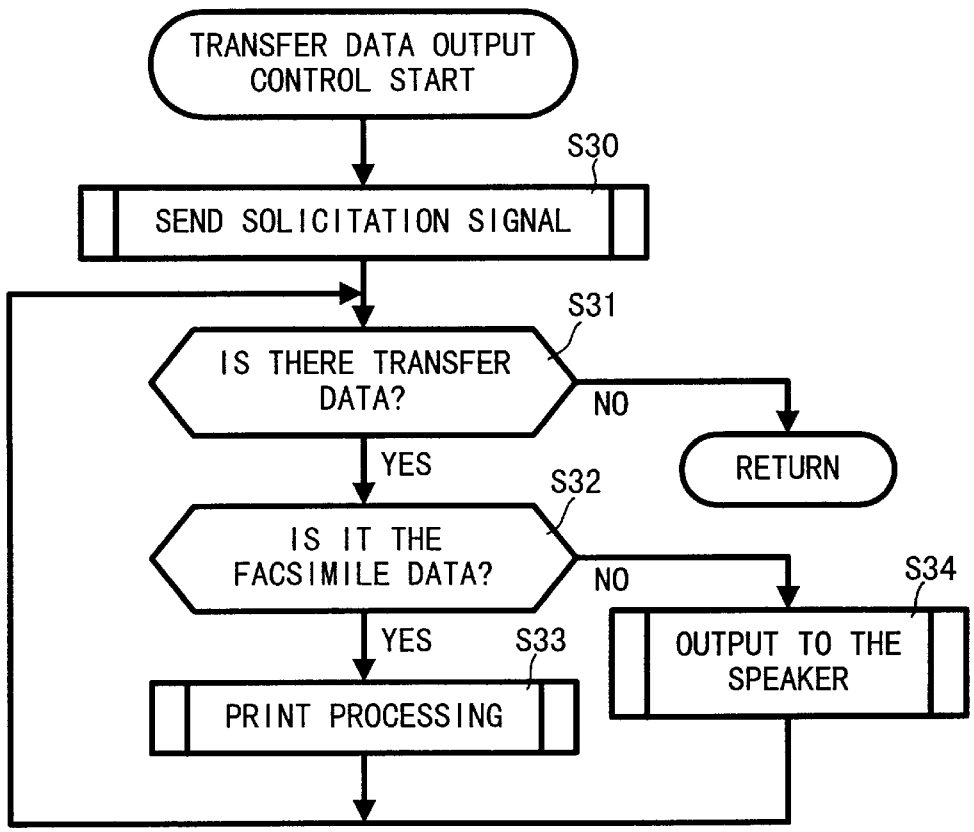
FIG. 6 is a flowchart illustrating the transfer data output control.

FIG. 6 illustrates the transfer data output control routine. The transfer data output control routine is executed when a predetermined key on the operation panel 3 is operated to transfer and output to the MFD 2 data received by and stored in the computer 8.

Figure 7:
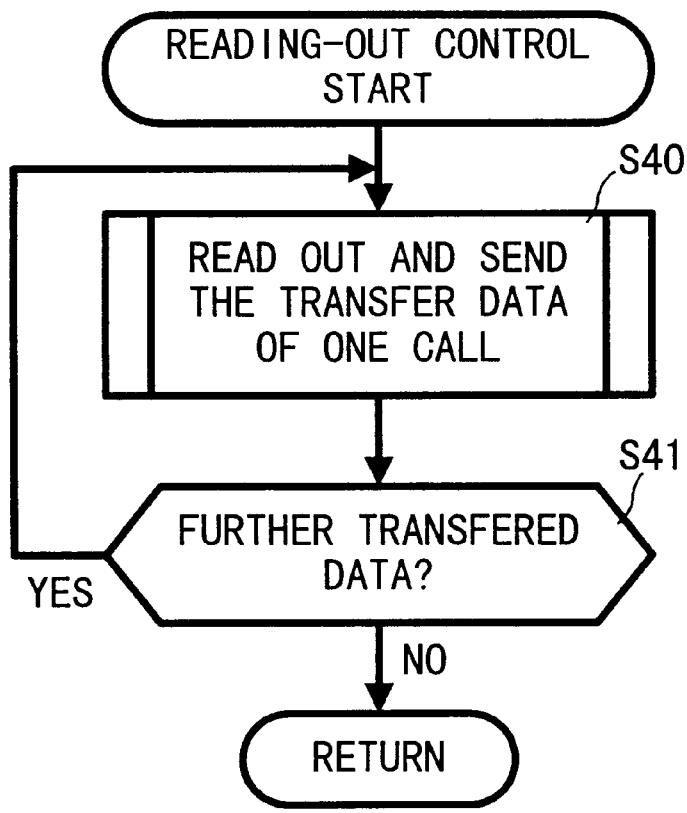
FIG. 7 is a flowchart illustrating the reading-out control routine.

The control is started at step S30, whereupon data sending a solicitation signal is output to the computer 8. When the data sending solicitation signal is received from the MFD 2, the readout control shown in FIG. 7 is started. At step S40, the transfer data of a call stored in the received data memory is read out and sent to the MFD 2. Then, at step S41, if there is further transfer data to be sent, the steps S40–S41 are repeatedly executed until there is no transfer data to be sent at which point, the process returns to the main routine.

Referring back to FIG. 6, at step S31 transfer data is received. If at step S32 the transfer data is facsimile data, the print process at step S33 is executed the same way as in step S18. Alternatively, if, at step S32, the transfer data is sound information, such as, for example, voice, the sound is output at step S34 by the speaker 6. Also, when an end of transmission command is received, the control is ended and the process returns to the main routine.

As described above, the type and function of each CI signal are made to correspond to each other and they are stored in the CI signal registration memory 12a provided on the ROM 12 of the MFD 2. When a CI signal during an incoming call is received by the telephone line 7 and it designates the computer 8, at least a part of the received data following that CI signal is sent to and stored in the computer 8. It is possible to retrieve the stored data, select only specific data to record and to print out this data on recording paper. Thus, the wasteful consumption of recording paper is prevented. In addition, data capable of being edited is easily stored in the computer 8 without using a read in device, such as, for example, an image reader or OCR.

Further, because an operation panel 3 is provided, it is possible to correlate the patterns of the plurality of CI signals sent from the line exchange corresponding with their respective functions, and to store these corresponding patterns and functions in a simple manner in the CI signal registration memory 12a.

As a modification of the embodiments described above, a design is also acceptable in which there is, for example, a memory receiving function in which there is registration through a distinctive ring service so that a plurality of call identity signals can be received, and in which received facsimile data is stored in the RAM 14 of the MFD 2.

Further, the computer 8 may be a notebook or laptop type for portable use and equipped with a communication function. Alternatively, in the event that a plurality of stationary computers 8 are connected to the MFD 2, the computers 8 may be individually designated. It is further acceptable to apply the invention to various multi-function complex devices in which various types of computers are connected to multi-function devices in which a plurality of functions such as a telephone, facsimile or answering machine functions can be implemented.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A multifunction communication device connected with a computer and a line exchange by an external communication line, the multifunction communication device having at least one of a print device and a handset, comprising:
    a signal identifier that identifies a specific pattern of a call identity signal from at least two patterns of call identity signals transmitted from said line exchange;
    a storage device that stores the specific pattern of the call identity signal transmitted from said line exchange, said specific pattern having a function designating said computer and remaining patterns of said at least two patterns of the call identity signals having a function designating at least one of said printing device and said handset, when said print device prints facsimile data on a recording medium and said handset communicates with voice data; and
    a signal transmitter that transmits to said computer at least a part of data following said call identity signal after said call identity signal has been identified by said signal identifier as said specific pattern having said function designating said computer.

2. The multifunction communication device of claim 1, wherein said at least two patterns of call identity signals are identified by said signal identifier as one of three patterns of call identity signals.

3. The multifunction communication device of claim 2, wherein said three patterns of call identity signals include a pattern having a function designating a telephone.

4. The multifunction communication device of claim 2, wherein said three patterns of call identity signals include a pattern having a function designating a facsimile.

5. The multifunction communication device of claim 2, wherein said three patterns of call identity signals include a pattern having a function designating a computer.

6. The multifunction communication device of claim 1, further comprising an input device that allocates a respective function for each of said at least two patterns of call identity signals transmitted from said line exchange.

7. The multifunction communication device of claim 6, wherein said input device includes an operation panel for installing said respective functions.

8. The multifunction communication device of claim 7, wherein said respective functions are input through an installing menu displayed on a display of said operation panel, said respective functions are installed by operating a function installing key provided on a keyboard of said operation panel.

9. The multifunction communication device of claim 6, wherein said respective function for each of said at least two patterns of call identity signals are stored in said storage device.

10. The multifunction communication device of claim 9, wherein said respective function includes at least one of a telephone function for sending and receiving sound signals to and from a receiver through a telephone line and a facsimile function for controlling the sending and receiving of image information as the facsimile data through a telephone line.

11. The multifunction communication device of claim 9, wherein said storage device includes a call identity signal registration memory for storing a corresponding pattern and function for each of said call identity signals.

12. The multifunction communication device of claim 1, further including a printer for printing data received from the computer.

13. The multifunction communication device of claim 1, further including an image scanner device for reading in and temporarily storing image data.

14. The multifunction communication device of claim 1, further including a speaker for outputting sound data received through a telephone line.

15. The multifunction communication device of claim 14, wherein said speaker outputs sound data received from the computer.

16. The multifunction communication device of claim 1, wherein said at least two patterns of call identity signals includes at least one of a pattern having a function designating a facsimile and a pattern having a function designating a telephone.

17. The multifunction communication device of claim 16, further including a printer for printing data following said call identity signal when said signal identifier identifies that a pattern from said at least two patterns of call identity signals has a function designating the facsimile.

18. The multifunction communication device of claim 16, further including a speaker for outputting sound data after said signal identifier identifies that a pattern from said at least two patterns of call identity signals has a function designating a telephone.

19. The multifunction communication device of claim 14, further including a printer for printing data received from the computer.

20. The multicommunication device of claim 1, further including a printer for printing data received through a telephone line.

21. A communication device connected with an external memory and a line exchange by an external communication line, the communication device having at least one of a print device and a handset, comprising:
    a signal identifier that identifies a specific pattern of a call identity signal from at least two patterns of call identity signals transmitted from said line exchange;
    a storage device that stores the specific pattern of the call identity signal transmitted from said line exchange, said specific pattern having a function designating said external memory and remaining patterns of said at least two patterns of the call identity signals having a function designating at least one of said printing device and said handset; and
    a signal transmitter that transmits to said external memory at least a part of data following said call identity signal after said call identity signal has been identified by said signal identifier as said specific pattern having said function designating said external memory, said at least a part of data being stored in said external memory.

22. The communication device of claim 21, wherein said external memory is detachably connected with the communication device.

23. A communication device connected with a line exchange by an external communication line, the communication device comprising:

a signal identifier that identifies a specific pattern of a call identity signal from at least two patterns of call identity signals transmitted from said line exchange;

a first memory that stores the specific pattern of the call identity signal transmitted from said line exchange;

a second memory that stores at least a part of data following said call identity signal;

a printer that prints out at least a part of data following said call identity signal on a medium; and a signal transmitter that transmits to said second memory or said printer at least a part of data following said call identity signal based on said call identity signal which has been identified by said signal identifier as said specific pattern having said function designating said second memory or said printer.

24. The communication device of claim 23, wherein said second memory is detachably connected with the communication device.

* * * * *